R. McK. NELSON.
PRESSURE GAUGE.
APPLICATION FILED NOV. 3, 1921.

1,436,895.

Patented Nov. 28, 1922.

INVENTOR
Ralph McK. Nelson
BY
Kerr, Page, Cooper & Hayward
ATTORNEYS

Patented Nov. 28, 1922.

1,436,895

UNITED STATES PATENT OFFICE.

RALPH McK. NELSON, OF SELLERSVILLE, PENNSYLVANIA, ASSIGNOR TO UNITED STATES GAUGE COMPANY, OF NEW YORK, N. Y., A CORPORATION OF PENNSYLVANIA.

PRESSURE GAUGE.

Application filed November 3, 1921. Serial No. 512,429.

*To all whom it may concern:*

Be it known that I, RALPH McK. NELSON, a citizen of the United States of America, residing at Sellersville, in the county of Bucks and State of Pennsylvania, have invented certain new and useful Improvements in Pressure Gauges, of which the following is a full, clear, and exact description.

The invention, subject of this application for Letters Patent, is an improvement in pressure gauges, more particularly such as are adapted for use with high pressure apparatus such as used, for example, in oxyacetylene welding and similar processes, and the nature of such improvement may be most readily gathered from the following prefatory considerations.

In these instruments, among the other precautions which it is necessary to take for efficiency and good practical use and operation, the making of perfect joints to resist the high pressure commonly used is a matter of first importance. Usually, and in the forms of such apparatus heretofore made, by the owner of this invention, a socket, usually composed of a naval bronze forging, in a single piece with a tapered threaded stem for connection with the pressure pipes or apparatus, has been employed and suitably punched or milled to admit the end of the Bourdon tube or spring, as it is termed, and drilled to afford a passage up through the threaded stem to the recess into which the end of such spring is inserted. The tube or spring has in these instruments been passed snugly into its seat or recess and secured by solder, during or subsequent to the insertion of which it was necessary to take some steps as by forcing air up through the gas passage and into the tube or the like in order to prevent the molten solder from entering or filling such passage.

In the great majority of cases this practice resulted in the production of durable and highly efficient gauges, but extensive manufacture and use of these instruments has developed a weak point for which no entirely satisfactory explanation can be, perhaps, found, but which is most objectionable from a manufacturing standpoint. No matter how carefully the joint between the socket and the Bourdon tube is made by soldering, it has been found that this joint, apparently due to a more or less porous or pervious condition of the solder, or to a tendency on the part of the moving tube to crystallize it, is apt to leak under heavy pressure of gas, and as such pressure is usually, or may be, very high it will be readily understood that the least tendency to leak at this joint renders the instrument wholly unfit for its intended purpose, so that it must either be remade at a high cost, or scrapped.

Seeking by all possible means known to me to overcome this objection, I have discovered that if between the upward gas passage through the socket and the lateral recess for receiving the end of the spring, a narrow tubular passage be formed and into this a small piece of brass tubing be forced, and the end of the spring be then passed into its seat over this tubing and then soldered without blowing through the passage or using any similar precautions, that a practically perfect joint under all ordinary conditions of pressure, temperature and use will be obtained.

This expedient involves but small additional, if any, expense, and makes certain the production of a perfect instrument where formerly the result seemed to depend either upon the skill of the workman or mere chance, which it is not possible for any one to tell with certainty.

This improvement I have illustrated in a gauge of more or less conventional character in the accompanying drawings, in which Fig. 1 is a view in elevation of a complete instrument, part of the outer casing being removed.

Figure 1:
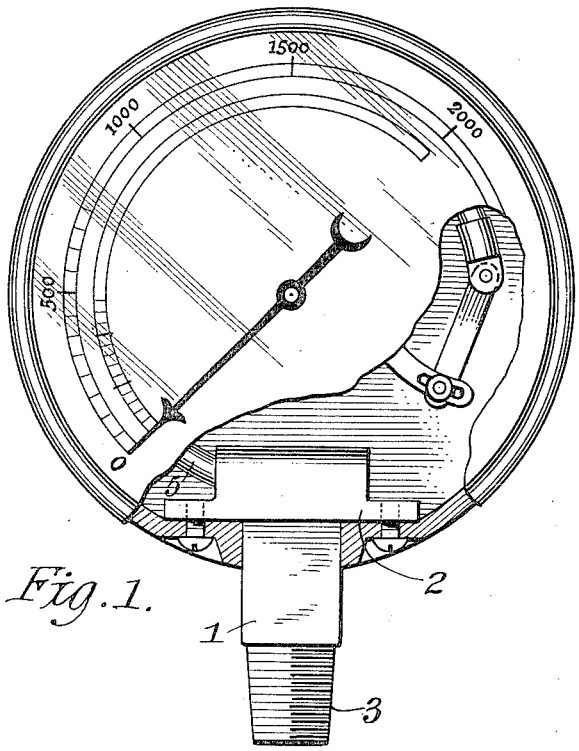
Figure 2:
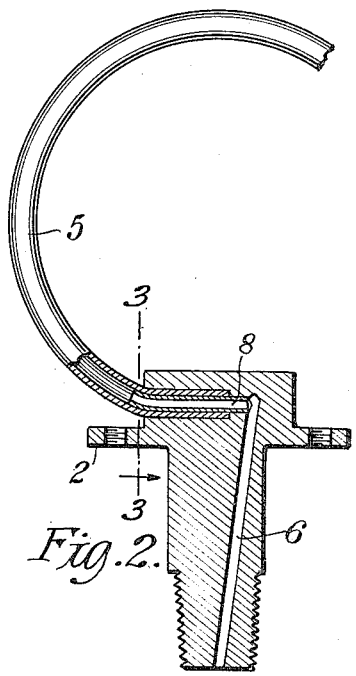
Fig. 2 is a view partly in elevation and partly in section of the main working parts of such instrument.
Figure 3:
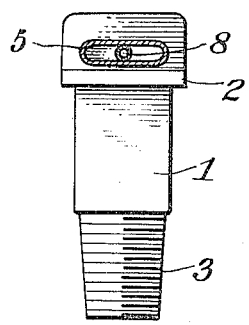
Fig. 3 is a view of the brass casting with the tube or spring in section, taken on line 3—3 of Fig. 2.
Figure 4:
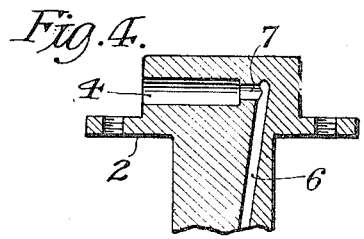
Fig. 4 is a central vertical section of such casting.
Figure 5:
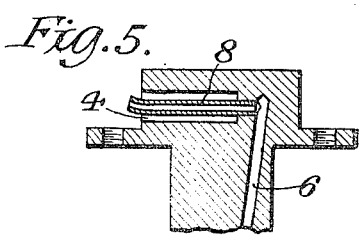
Fig. 5 is a similar view showing the short metal tube in place.

The general character of the gage as a whole is not of the essence of the invention. I prefer, however, to apply the improvements to the type of gauge shown in United States reissued Letters Patent to Frederick Schubert, No. 14,339 of July 31, 1917.

In this gauge there is employed a single solid bronze or brass socket 1, with a flange 2 for attaching it to the gauge casing and a tapered threaded stem 3 for union with a pressure apparatus or pipe. This socket is formed with a transversely elongated or widened recess or seat 4 to receive the end of the Bourdon tube or spring 5, and an approximately vertical passage 6 up through the stem. Between the enlarged recess 4 and this passage 6 a round passage 7 is bored through an intervening wall of a thickness approximating one quarter of an inch, more or less.

In building this instrument the elongated recess is tinned after passage 7 is formed and a short length of brass tubing 8 is forced into the passage 7 and projects into the recess 6. The open end of the spring 5 is then tinned and passed over the tube 8 into the recess 4. After the joint is properly heated, solder is run down from the outside of the Bourdon tube to secure such tube in place and complete the joint in the usual manner.

A gauge thus made will be found to be entirely free from leaks, and may be made by any ordinarily skilled worker in this art. The length of the smaller or inner tube is a matter of choice, but the best results have been found to follow the use of a tube extending slightly beyond the recess 4.

What I claim as my invention is:

1. A pressure gauge comprising in combination, a solid socket or casting formed with a lateral recess to secure the end of the Bourdon tube, with a vertical passage, and a short lateral passage connecting the said recess and said vertical passage, of a short tube of small diameter secured in said lateral passage and extending into the recess, and a Bourdon tube passing over said short tube and into the recess and secured to the socket by solder, as herein set forth.

2. In a pressure gauge, the combination with a solid socket or casting formed with a recess to receive the end of a Bourdon tube and with a passage communicating therewith, of a short tube of small diameter secured in said socket and a Bourdon tube passing into the recess over the tube of small diameter and soldered to form a tight joint with said socket.

3. In a pressure gauge, the combination with a solid casting or socket formed with a recess to receive the end of the spring and a passage through the socket communicating therewith, of a short tube secured in the socket and extending through the recess, a spring passed into the recess and over the short tube and united to the socket by solder around the sides of the recess and the sides of the spring.

In testimony whereof I hereto affix my signature.

RALPH McK. NELSON.